Jan. 3, 1967 R. A. ANDERSEN ET AL 3,296,613
INTEGRATING CONVERTER
Filed Dec. 3, 1963
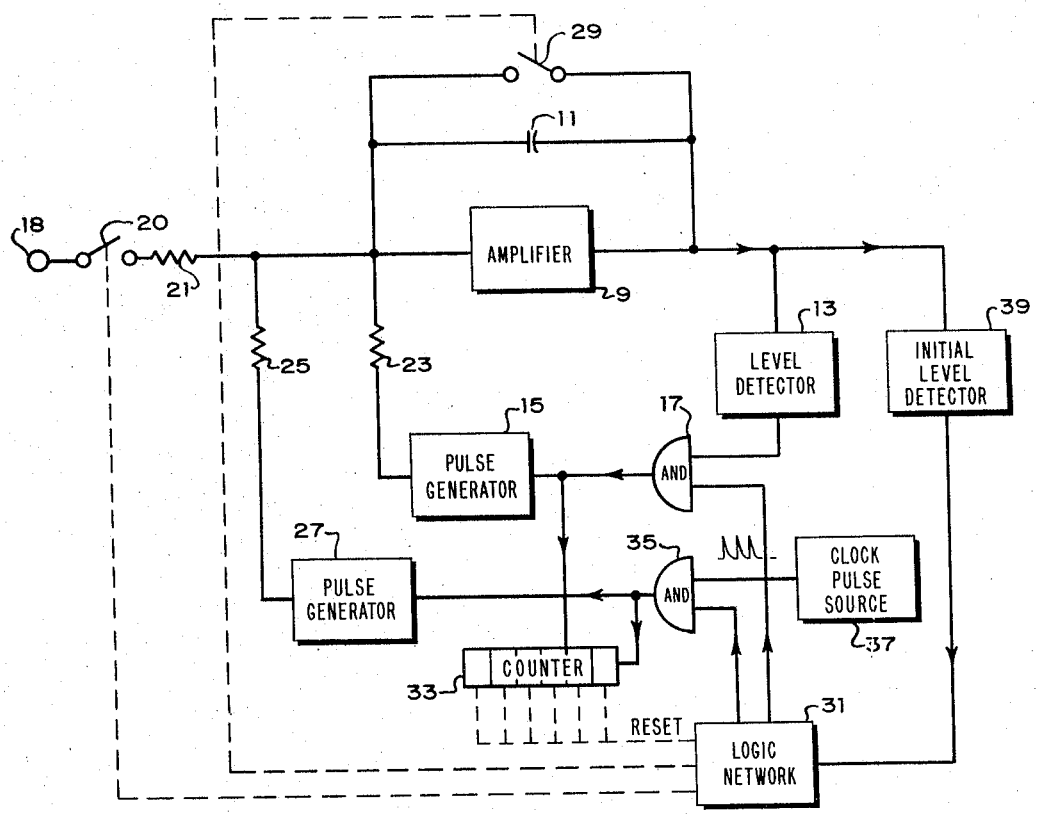
INVENTORS
ROBERT A. ANDERSEN
RODNEY E. COOLEY
BY
ATTORNEY

United States Patent Office 3,296,613
Patented Jan. 3, 1967

3,296,613
INTEGRATING CONVERTER
Robert A. Andersen, Palo Alto, and Rodney E. Cooley, Menlo Park, Calif., assignors to Hewlett-Packard Company, Palo Alto, Calif., a corporation of California
Filed Dec. 3, 1963, Ser. No. 327,706
2 Claims. (Cl. 340—347)

This invention relates to an electrical circuit for converting the integral of an applied voltage to a related digital indication with high accuracy and resolution.

In many applications the accuracy of measuring instruments which provide a digital indication of the applied analog signal can be greatly increased by integrating the analog signal over a predetermined period of time. The integration averages any noise that might be superimposed on the signal. Periodic noise having a period related to the predetermined period of integration is completely averaged out. Therefore, in order to reject noise resulting from pick-up from A.C. power lines, the period of integration is related to the period of the power line signal.

The minimum period of integration (for maximum measurement speed) where noise is typically pick-up from 60 cycle power lines is one sixtieth of a second. However, this short period of integration severely limits the resolution with which the conversion of an analog signal to a digital indication can be made using economical low frequency counting techniques.

Accordingly, it is an object of the present invention to provide a high speed integrating analog to digital converter which utilizes low frequency techniques to convert an applied analog signal to a digital indication with high accuracy and resolution.

It is another object of the present invention to provide an integrating voltage-to-pulse code converter having high conversion accuracy and resolution.

It is still another object of the present invention to provide an integrating analog to digital converter having an interpolation cycle following the integration period.

In accordance with the illustrated embodiment of the present invention an integrator is connected to receive an analog signal and a train of pulses of opposite polarity and known area for a selected integrating period. The output of the integrator is then measured after the integrating period. The measurement is an interpolation performed by returning the integrator output to an initial level using pulses of known area to reduce the charge on the integrating capacitor. The number of pulses applied to the integrator during the integrating and interpolating periods thus provides a digital indication of the analog signal.

Other and incidental objects of the present invention will be apparent from a reading of this specification and an inspection of the accompanying drawing which shows a block diagram of one embodiment of the converter of the present invention.

Referring to the drawing, there is shown an amplifier 9 shunted by a capacitor 11 to form a current integrator having an output voltage proportional to the integral of input current. Level detector 13 connected to the output of the integrator triggers pulse generator 15 each time the integrator output attains a selected value during the time gate 17 is conductive. The analog signal at terminal 18 is applied to the input of the integrator through serially-connected switch 20 and resistor 21. Constant area pulses from generator 27 are applied to the input through resistor 25 when gate 35 is conductive.

At the start of the integrating period of operation, switch 20 which is controlled by logic network 31 is closed and switch 29 also controlled by network 31 is opened, thereby rendering the amplifier 9 and capacitor 11 effective to integrate the analog signal appearing at terminal 18. The output of the integrator thus increases with time from an initial value. When this output attains a selected value of either polarity, level detector 13 triggers pulse generator 15 through gate 17. Generator 15 then applies to the input of the integrator a pulse of known area and of polarity opposite to that of the analog signal at terminal 18. This pulse removes charge from capacitor 11 and decreases the output of the integrator to a lower value. The output again increases toward the selected value. Other methods such as momentarily short circuiting capacitor 11 may be used to remove charge therefrom to reduce the integrator output. This process continues repetitively during the time that gate 17 is maintained conductive.

The number of trigger signals applied to pulse generator 15 from level detector 13 during the conductive period of gate 17 is thus an indication of the amplitude of signal at terminal 18. These trigger signals are applied in this example to the hundreds decade of counter 33 during the conduction period of gate 17. This conduction period is typically one sixtieth of a second (the period of power line signal) so that power line hum is integrated out of low level signals. The decades of counter 33 are reversible so that a change of polarity of the analog signal during the integration period may vary the count through zero to properly reflect the integral with time of the analog signal. The integration and conversion to a representative frequency of an analog signal at terminal 18 ends when gate 17 is rendered nonconductive and switch 20 is opened by logic network 31.

In general, the output of the integrator will have some value between the initial and above-mentioned selected values at the end of the integration period. This integrator output may be measured directly or interpolated as in the present invention to yield higher accuracy conversion of the analog signal to a representative number of pulses. Following the integration period, gate 35 is rendered conductive by logic network 31. This permits clock pulses from source 37 to trigger pulse generator 27 at a selected rate. The combination of resistor 25 and the amplitude of pulses from generator 27 is chosen in this embodiment to supply to the input of the integrator pulses having an effective area which is one hundred times smaller than the effective area of pulses supplied to the integrator from generator 15. The output of the integrator following the integration period is thus decreased toward the initial value in steps one one-hundredth the size of the decrements occurring during the integration period. These decrements in integrator output continue one per clock pulse until the output attains the initial value. At that instant, the initial level detector 39 triggers logic network 31 to render gate 35 nonconductive, thus ending the interpolation period. The number of clock pulses applied to pulse generator 27 during the interpolation period to reduce the integrator output to the initial value is registered by the units decade of counter 33. In another embodiment of the invention one pulse generator is used to supply the integrating and interpolating pulses. A resistive network having selectable resistance values is used to alter the effective area of the applied pulses. Still another embodiment utilizes D.C. feedback to the input of amplifier 9 during the interpolation period. Clock pulses are then counted for the time required to restore the integrator to its initial level.

The sum of the trigger signals applied to pulse generators 15 and 27 during the integrating and interpolating cycles is thus a digital indication of the analog signal at terminal 18. Following the interpolation period, switch 29 is closed by logic network 31 to set the integrator to the initial value, typically zero output. Before another conversion cycle starts, counter 33 is reset by logic network 31.

We claim:
1. Signal apparatus comprising:
   an integrator having an input and an output;
   means for applying signal to the input of said integrator only for a selected period to increase the signal at the output of the integrator with time from an initial value and for rendering said integrator inoperative on applied signal substantially at end of said selected period;
   circuit means connected to the output of said integrator for producing a control signal during said selected period in response to the signal at said output attaining a predetermined value;
   means connecting the output of said circuit means and the input of said integrator for applying a signal thereto during said selected period in response to each control signal to decrease the signal at the output of said integrator by a selected decrement;
   means connected to the input of said integrator for applying a signal thereto after said selected period to decrease the signal at the output of said integrator to said initial value; and
   means to produce an output related to the signals applied to the input of said integrator during and after said selected period.

2. Apparatus as in claim 1 wherein the signals applied to the input of said integrator during said selected period are pulses of selected area, and the signals applied to said integrator after selected period are pulses of area less than said selected area and said apparatus further comprises:
   a counter connected to count a number of pulses related to the number of said pulses applied to the input of said integrator during and after said selected period.

References Cited by the Examiner

UNITED STATES PATENTS

| | | | |
|---|---|---|---|
| 2,891,725 | 6/1954 | Blumenthal et al. | 235—183 |
| 2,864,556 | 12/1958 | Raymond | 235—183 |
| 2,903,185 | 9/1959 | Myers | 235—183 |
| 3,002,690 | 10/1961 | Meyer | 235—183 |
| 3,048,336 | 8/1962 | Ritzenthaler | 235—183 |
| 3,188,455 | 6/1965 | Quick | 340—347 |

OTHER REFERENCES

IBM Tech. Discl. Bulletin, vol. 5, No. 8 (Intergrating A-D Converter) pages 51–52, January 1963.

MAYNARD R. WILBUR, *Primary Examiner.*

M. A. MORRISON, *Examiner.*

K. R. STEVENS, W. J. KOPACZ, *Assistant Examiners.*